United States Patent

Coleman et al.

Patent Number: 6,027,752
Date of Patent: Feb. 22, 2000

[54] PLUSH CANDY POP HOLDING DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/058,801

[22] Filed: Apr. 13, 1998

[51] Int. Cl.⁷ .................................................. A23G 9/22
[52] U.S. Cl. ............................................. 426/134; 446/73
[58] Field of Search ............................ 426/90, 91, 104, 426/132, 134, 421; 446/71, 72, 73, 77, 369, 370, 386, 81; 428/16

[56] References Cited

U.S. PATENT DOCUMENTS

| | | | |
|---|---|---|---|
| D. 122,659 | 9/1940 | Cox | D1/104 |
| D. 155,978 | 11/1949 | Fine | D28/6 |
| 2,031,208 | 2/1936 | Burgard | 426/386 |
| 2,117,962 | 5/1938 | Johnson | 446/72 |
| 2,193,522 | 3/1940 | Ross | 446/374 |
| 3,099,568 | 7/1963 | Brody et al. | 426/104 |
| 3,526,103 | 9/1970 | Lieber | 63/23 |
| 3,615,596 | 10/1971 | Petti et al. | 426/104 |
| 4,048,749 | 9/1977 | Zitting et al. | 446/363 |
| 4,333,974 | 6/1982 | Davis | 428/16 |
| 5,322,036 | 6/1994 | Merino | 166/268 |
| 5,391,107 | 2/1995 | Coleman et al. | 446/484 |
| 5,676,988 | 10/1997 | Coleman et al. | 426/134 |

Primary Examiner—David Lacey
Assistant Examiner—Sherry A. Dauerman
Attorney, Agent, or Firm—Melvin L. Crane, Agent

[57] ABSTRACT

A plush candy pop holding device which is made of a soft, squeezable housing that can be made either solid or hollow, as long as the exterior layer is somewhat pliable providing a pleasing touch to the holder. The upper end of the main housing has an aperture which has an expandable sleeve for receiving the candy stick to fit securely therein. The candy stick holder is of an expandable size to accommodate most single lollipops on the market today. The entire holding device is supported by a base which allows the product to stand in an upright fashion. The plush pop can be made with a washable surface. The housing could be made to accommodate a variety of body styles such as balls, heads, animal shapes, etc. to provide a pleasant look and feel for the entertainment of children of all ages.

10 Claims, 1 Drawing Sheet

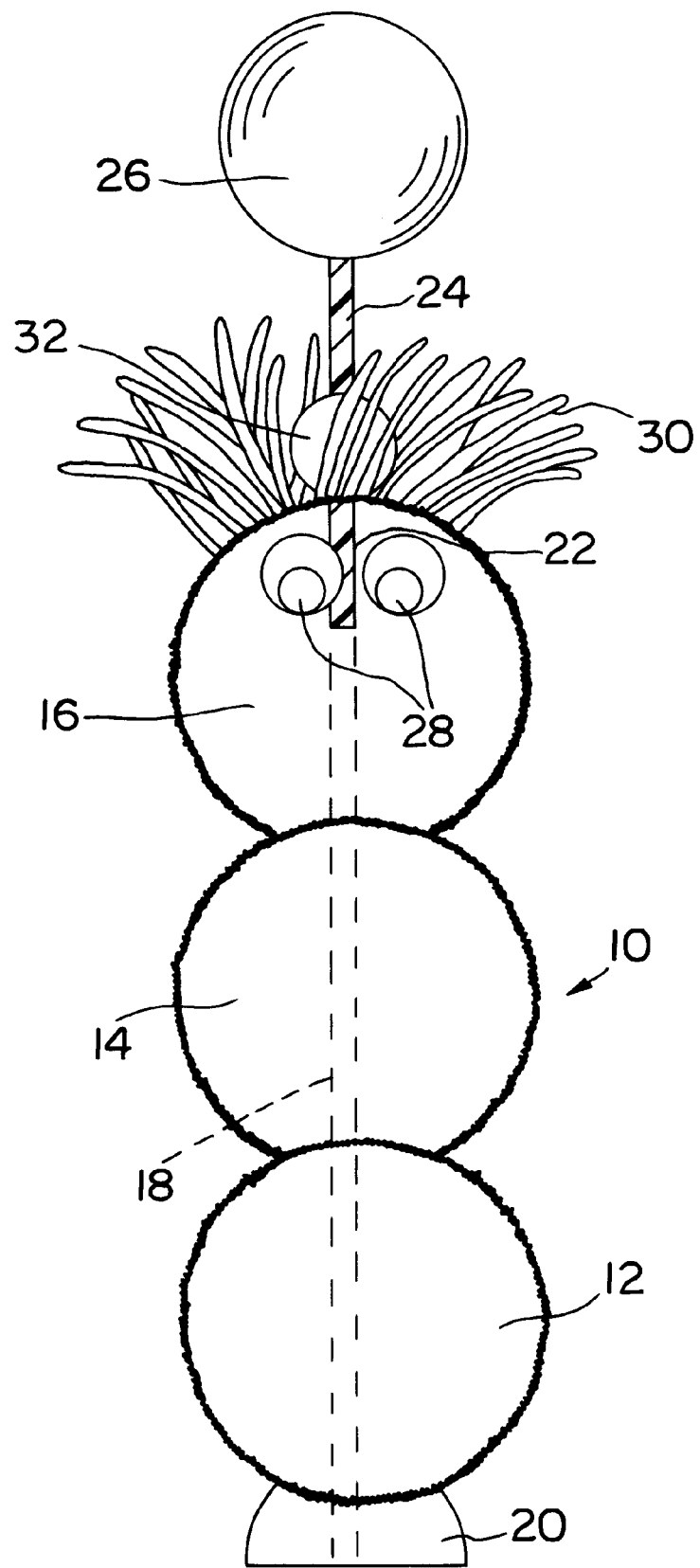

PLUSH CANDY POP HOLDING DEVICE

This invention is directed to a plush candy pop holding device designed to enhance an enjoyment of a consumer by adding a more tactile sucker stick holder.

Various types of candy pop holders have been provided by which a candy pop is held in place in combination with some other amusing device.

OBJECTS OF THE INVENTION

An object of the invention is to provide a plush candy pop holding device which is designed to enhance an enjoyment of the candy pop consumer.

Another object is to provide a soft, nice-feeling holder to which a candy pop may be secured.

Yet another object is to provide a plush soft material with a support for standing alone to which a candy pop may be secured.

Other objects and advantages of the invention will become obvious to those skilled in the art when considered with the specification and drawing.

BRIEF DESCRIPTION OF THE DRAWING

The FIGURE is a front view of the device illustrating the related parts.

DETAILED DESCRIPTION

Now referring to the drawing, there is shown a plush candy pop holder which includes a body 10 formed by a plurality of soft, squeezable, cuddly body portions 12, 14, 16 which can be of any desired style such as square, round, cylindrical, or any shape in which the body portions are hollow or solid, and made of a pliable material. If the body parts are made hollow, they may be provided with an axial sleeve through which a stiff solid or hollow support 18 can pass in order to support the body portions in an upright position on a base 20. As shown, the body is made of three pliable cylindrical shaped balls which may have an outer covering of a soft material, or the balls may be made entirely of a pliable soft, cuddly material.

If one desires to not have the device stand in an upright position, the device may be made of body portions which are secured to each other but which will not stand alone.

The upper end of the upper body part is provided with an expandable sleeve 22 which receives the end of a candy stick 24 which has a candy pop 26 thereon and is expandable in order to accommodate different diameter-sized sticks. The expandable sleeve could be formed by the upper end of a hollow support rod 18 which also supports the device in an upright position.

The upper body portion has been shown with imitation eyes 28, artificial hair 30, and a small ball 32 within the hair. It would be obvious to one skilled in the art with the above description to make the plush candy-holding device in any body style desired so long as the parts are soft, squeezable, cuddly, and provide an entertaining look and feel for the enjoyment of different persons. Also, it would be obvious that once the candy has been consumed from one stick, that the stick can be replaced by another candy pop and stick. For one-time use, the candy could be secured to the upper end and not be replaceable.

The device can be made of washable material so that the device could be washed without a candy pop secured thereto.

The foregoing relates to preferred exemplary embodiments of the invention, it being understood that other variants and embodiments thereof are possible within the spirit and scope of the invention, the latter being defined by the appended claims.

We claim:

1. A plush candy pop holding device, which comprises:
    a body including a plurality of aligned soft, squeezable, cuddly bodies,
    one of said bodies including an upper end with an aperture, and
    an expandable sleeve within said body adjoining said aperture constructed so as to receive a stick end of a candy pop.

2. A plush candy pop holding device as set forth in claim 1, which includes
    a support means including a base for supporting said body in an upright position.

3. A plush candy pop holding device as set forth in claim 2, in which
    said support means is secured along an axis of said body and extends from said base to at least as far as said expandable sleeve within said body.

4. A plush candy pop holding device as set forth in claim 2, in which
    said expandable sleeve is formed by an upper end of said support means.

5. A plush candy pop holding device as set forth in claim 3, in which
    said expandable sleeve is formed by an upper end of said support means.

6. A plush candy pop holding device as set forth in claim 2, in which
    said support means includes an axial rod or tube which extends to and is supported by said base upon which said device rests.

7. A plush candy pop holding device as set forth in claim 3, in which
    said support means includes an axial rod or tube which extends to and is supported by said base upon which said device rests.

8. A plush candy pop holding device as set forth in claim 4, in which
    said support means includes an axial rod or tube which extends to and is supported by said base upon which said device rests.

9. A plush candy pop holding device as set forth in claim 1, in which
    said body including a plurality of aligned soft, squeezable, cuddly bodies, including three spherical sections, each of the same material.

10. A plush candy pop holding device as set forth in claim 1, in which the candy is secured to an upper end of the device and is not replaceable.

* * * * *